(12) United States Patent
Holder et al.

(10) Patent No.: US 12,529,571 B2
(45) Date of Patent: Jan. 20, 2026

(54) SYSTEM AND METHOD FOR PROVIDING A PREDICTED CURRENT DESTINATION TO A USER OF A VEHICLE

(71) Applicant: Bayerische Motoren Werke Aktiengesellschaft, Munich (DE)

(72) Inventors: Stefan Holder, Munich (DE); Daniel Kotzor, Seefeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 113 days.

(21) Appl. No.: 18/565,857

(22) PCT Filed: Mar. 1, 2022

(86) PCT No.: PCT/EP2022/055128
§ 371 (c)(1),
(2) Date: Nov. 30, 2023

(87) PCT Pub. No.: WO2023/274585
PCT Pub. Date: Jan. 5, 2023

(65) Prior Publication Data
US 2024/0247939 A1 Jul. 25, 2024

(30) Foreign Application Priority Data
Jun. 30, 2021 (DE) .................... 10 2021 116 779.5

(51) Int. Cl.
*G01C 21/36* (2006.01)
*G06N 20/00* (2019.01)

(52) U.S. Cl.
CPC ......... *G01C 21/3617* (2013.01); *G06N 20/00* (2019.01)

(58) Field of Classification Search
CPC ..... G01C 21/36; G01C 21/3617; G06N 20/00
(Continued)

(56) References Cited

U.S. PATENT DOCUMENTS 11,803,790 B2 * 10/2023 Di Lorenzo ....... G06Q 10/0631
2013/0262349 A1 * 10/2013 Bouqata ................ G06N 20/10
706/12

(Continued)

FOREIGN PATENT DOCUMENTS

CA           3077984 A1 * 12/2018 ............. G06Q 10/02
CN       117035207 A  * 11/2023 ........... G06Q 10/047

(Continued)

OTHER PUBLICATIONS

Cao et al., "Using Reinforcement Learning to Minimize the Probability of Delay Occurrence in Transportation," in IEEE Transactions on Vehicular Technology, vol. 69, No. 3, pp. 2424-2436, Mar. 2020, doi: 10.1109/TVT.2020.2964784 (https://ieeexplore.ieee.org/document/8952783) (Year: 2020).*

(Continued)

*Primary Examiner* — Atul Trivedi
(74) *Attorney, Agent, or Firm* — Maginot, Moore & Beck LLP (57) ABSTRACT

A method for providing a predicted current destination to a user of a vehicle includes receiving a first quantity of destinations of the user for a first period of time, and receiving a first data set of hyperparameters of a machine learning method. The method further includes training the machine learning method with the received hyperparameters using the first quantity of destinations as training data, receiving a second quantity of destinations of the user for a second period of time, predicting destinations and probabilities of the destinations, evaluating the predicted destinations and the probabilities of the predicted destinations from the second quantity of destinations with a cost function. When the cost function indicates that a display frequency increases, the method includes predicting a current destination and a probability of the current destination with the trained machine learning method having the second data set (Continued)

of hyperparameters, and providing the predicted current destination to the user when the probability of the predicted current destination exceeds a predefined threshold value.

20 Claims, 3 Drawing Sheets

(58) Field of Classification Search
USPC .......................................................... 701/445
See application file for complete search history.

(56) References Cited

U.S. PATENT DOCUMENTS

| | | | | |
|---|---|---|---|---|
| 2016/0003637 | A1* | 1/2016 | Andersen | G01C 21/362 |
| | | | | 701/519 |
| 2017/0255966 | A1* | 9/2017 | Khoury | B60W 40/00 |
| 2018/0136005 | A1* | 5/2018 | Forutanpour | G01C 21/3476 |
| 2018/0238701 | A1* | 8/2018 | Liebinger | G01C 21/3626 |
| 2018/0340790 | A1* | 11/2018 | Kislovskiy | G01C 21/3484 |
| 2020/0249674 | A1* | 8/2020 | Dally | G05D 1/0221 |
| 2020/0326194 | A1* | 10/2020 | Wang | G01C 21/3484 |
| 2021/0043086 | A1 | 2/2021 | Chen et al. | |
| 2021/0063181 | A1* | 3/2021 | Saleh | G01C 21/3492 |
| 2021/0142248 | A1* | 5/2021 | Balva | G08G 1/202 |
| 2021/0150896 | A1* | 5/2021 | Rakshit | G08G 1/20 |
| 2021/0374569 | A1* | 12/2021 | Jezewski | G06N 20/00 |
| 2022/0090922 | A1* | 3/2022 | Neumann | G01C 21/3415 |
| 2023/0087780 | A1* | 3/2023 | Krishnarao | G01C 21/3461 |
| | | | | 701/533 |
| 2024/0085193 | A1* | 3/2024 | Tisseur | G01C 21/3469 |

FOREIGN PATENT DOCUMENTS

| | | | | |
|---|---|---|---|---|
| DE | 112014005164 | T5 | 9/2016 | |
| DE | 102018209804 | A1 * | 12/2019 | ......... G01C 21/3697 |
| DE | 102020132591 | A1 | 6/2021 | |
| EP | 3819828 | A1 | 5/2021 | |
| EP | 3822876 | A2 | 5/2021 | |
| GB | 2615838 | A * | 8/2023 | .......... B60W 60/001 |
| WO | WO-2007040891 | A1 * | 4/2007 | .......... G08G 1/0969 |
| WO | WO-2021183128 | A1 * | 9/2021 | ......... G01C 21/3667 |

OTHER PUBLICATIONS

International Search Report corresponding to International Patent Application No. PCT/EP2022/055128, dated Jun. 23, 2022 (5 pages).
Written Opinion corresponding to International Patent Application No. PCT/EP2022/055128, dated Jun. 23, 2022 (10 pages).
German Search Report corresponding to German Patent Application No. 10 2021 116 779.5, dated Nov. 30, 2021. (5 pages).
P. Ebel et al.: "Destination Prediction Based on Partial Trajectory Data", 2020 IEEE Intelligent Vehicles Symposium (IV), 2020, pp. 1149-1155, doi: 10.1109/IV47402.2020.9304734.
Q. Han et al.: "A Prediction Method for Destination Based on the Semantic Transfer Model", in IEEE Access, vol. 7, pp. 73756-73763, 2019, doi: 10.1109/ACCESS.2019.2918594.
Tang, J., Liang, J., Yu, T., Xiong, Y., & Zeng, G. (2021). Trip destination prediction based on a deep integration network by fusing multiple features from taxi trajectories. IET Intelligent Transport Systems, 15(9), 1131-1141.

* cited by examiner

SYSTEM AND METHOD FOR PROVIDING A PREDICTED CURRENT DESTINATION TO A USER OF A VEHICLE

CROSS-REFERENCE TO RELATED APPLICATIONS

The present application is the U.S. national phase of PCT Application PCT/EP2022/055128 filed on Mar. 1, 2022, which claims priority of German patent application No. 10 2021 116779.5 filed on Jun. 30, 2021, the entire contents of which are incorporated herein by reference.

FIELD

The disclosure herein relates to a system and method for providing a predicted current destination to a user of a vehicle.

BACKGROUND

Target estimation methods that maximize a success frequency of a proposed target are known from the prior art. Each target estimate is displayed to a user. The user can perform actions based on the displayed target estimate.

SUMMARY

In view of the foregoing, it would be advantageous to predict a current destination of a user more efficiently. In particular, it would be advantageous to provide a predicted current destination more efficiently to a user of a vehicle.

According to a first aspect of the disclosure, a method is disclosed for providing a predicted current destination to a user of a vehicle. The method may be a method implemented by a computer and/or a method implemented by a control device. The vehicle may be a motor vehicle. The predicted current destination may be provided to the user of the vehicle at the start of a journey and/or during a journey with the vehicle. The predicted current destination may be provided to a mobile terminal device of the user, a display device of the vehicle and/or a navigation system of the vehicle. The method comprises receiving a first quantity of destinations of the user f the vehicle for a first period of time and receiving a first data set of hyperparameters of a machine learning method. The first data set of hyperparameters may be a predefined standard configuration or an initially specified configuration of the machine learning method. The method further comprises training the machine learning method with the received hyperparameters of the machine learning method using the first set of destinations as training data.

The method further comprises receiving a second quantity of destinations of the user of the vehicle for a second period of time. The second quantity of destinations of the user may correspond to the first quantity of destinations of the user. The second period of time may correspond to the first period of time. Preferably, the first quantity of destinations is different from the second quantity of destinations, and the first period of time is different from the second period of time. Preferably, the first quantity of destinations and the second quantity of destinations form a total quantity of destinations of a user of the vehicle. The first quantity of destinations for the first period of time may comprise older destinations of the user of the vehicle, while the second quantity of destinations for the second period of time may comprise more recent destinations of the user.

The method comprises predicting destinations and probabilities of the destinations from the second quantity of destinations as validation data with the trained machine learning method having the first data set of hyperparameters. Further, the method comprises evaluating the predicted destinations and the probabilities of the predicted destinations from the second quantity of destinations with a cost function, wherein the cost function evaluates a display frequency and a precision of the predicted destinations. The method determines a second data set of hyperparameters of the machine learning method. For example, the second data set of hyperparameters may be determined by means of a hyperparameter optimization method.

Further, the method comprises training the machine learning method with the second data set of hyperparameters of the machine learning method using the first quantity of destinations as training data, predicting the destinations and the probabilities of the destinations from the second quantity of destinations as validation data with the trained machine learning method having the second data set of hyperparameters, and evaluating the predicted destinations and the probabilities of the predicted destinations from the second quantity of destinations with the cost function. If the cost function indicates that the display frequency increases, while maintaining precision, with the machine learning method having the second data set of hyperparameters, the method predicts a current destination and a probability of the current destination with the trained machine learning method having the second data set of hyperparameters, and provides the predicted current destination to the user if the probability of the predicted current destination exceeds a predefined threshold value.

Advantageously, the method can predict the current destination more accurately and provide the user of the vehicle only with destinations that are highly relevant to the user of the vehicle. By validating the predicted destinations by the cost function and adapting the hyperparameters of the learning method in dependence on the cost function, the machine learning method can be improved efficiently in order to predict destinations that are as correct as possible for the user and provide them to the user.

According to an advantageous design of the system and method disclosed herein, the method may furthermore comprise predicting a current destination and a probability of the current destination with the trained machine learning method having the first data set of hyperparameters, and providing the predicted current destination to the user if the probability of the predicted current destination exceeds a predefined threshold value: if the cost function indicates that the display frequency falls or remains the same, while maintaining precision, with the machine learning method having the second data set of hyperparameters. This allows the adaptation of the hyperparameters to be controlled efficiently.

According to a further, advantageous design of the system and method disclosed herein, a destination from the first quantity of destinations may be a clustered destination, and/or a destination from the second quantity of destinations may be a clustered destination, and/or a destination from the first quantity of destinations and/or a destination from the second quantity of destinations may be a historical destination of the user of the vehicle.

According to a further, advantageous design of the disclosure, the predefined threshold value may be a user-specific threshold value. This allows the method to efficiently adapt the provision of the predicted current destination to a user preference. If the user wants to have displayed frequently predicted current destinations that may be less accurate, the user can reduce the user-specific threshold value. If the user wants to be provided only with destinations that have a high level of accuracy, the user can increase the user-specific threshold value.

According to a further, advantageous design of the disclosure, the current destination and the probability of the current destination may be predicted with the machine learning method in dependence on a vehicle position at the start of the journey and/or a departure time of the journey. This allows a current destination to be predicted in a flexible manner. The user does not have to manually enter the current destination before and/or during the journey.

According to a further aspect, the system and method disclosed herein is characterized by a computer-readable medium for providing a predicted current destination to a user of a vehicle, wherein the computer-readable medium comprises instructions which, when executed on a computer and/or a control device, execute the method described above. Control devices are commonly used in vehicles or in association with vehicle operation, configuration or maintenance. Control devices (which may also be referred to herein as "control units," "controllers," "processors" or "microprocessors") include circuits (e.g., integrated circuits) that contain typical functionality of central processing units (CPU) and are configured to perform various calculations and analysis based on manufacturer programming. Examples of controllers used in vehicles include any Engine Control Units (ECNs) commonly used by different manufacturers in modern automobiles.

According to a further aspect, the system and method disclosed herein is characterized by a system for providing a predicted current destination to a user of a vehicle, wherein the system is designed to perform the method described above.

According to a further aspect, the system and method disclosed herein is characterized by a vehicle comprising the system, described above, for providing a predicted current destination to a user of the vehicle.

According to a further aspect, the system and method disclosed herein is characterized by a mobile terminal device comprising the system, described above, for providing a predicted current destination to a user of a vehicle.

Further features of the system and method disclosed herein are given by the claims, the figures and the description of the figures. All the aforementioned features and combinations of features mentioned in the description, as well as the features and combinations of features mentioned below in the description of the figures and/or shown only in the figures, can be used, not only in the combination indicated in each case, but also in other combinations or on their own.

BRIEF DESCRIPTION OF THE DRAWINGS

A preferred exemplary embodiment of the system and method disclosed herein is described in the following with reference to the accompanying drawings. This provides further details, preferred designs and developments of the disclosure. In detail, in the schematic drawings.

DESCRIPTION

Figure 1:
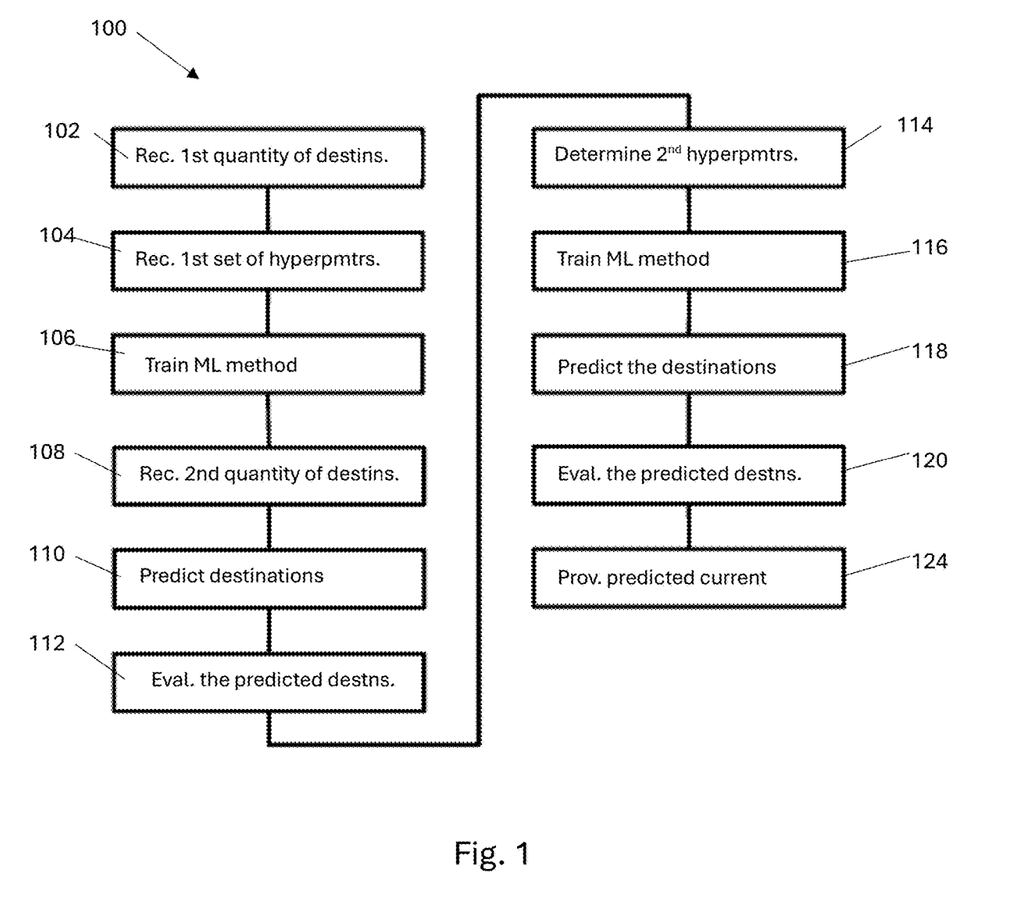
FIG. 1 shows an example of a method for providing a predicted current destination to a user of a vehicle.

In detail, FIG. 1 shows an example of a method 100 for providing a predicted current destination to a user of a vehicle. The method 100 may receive 102 a first quantity of destinations from destinations of the user of the vehicle for a first period of time. The first quantity of destinations may comprise historical destinations of the user in the first period of time. The first period of time may be a sub-division of a total period of time, which may be divided into a first period of time and a second period of time. For example, if the total period of time comprises a period of time of 6 months, the total period of time may be divided into a first period of time of 4 months and a second period of time of 2 months. Preferably, the first period of time is greater than the second period of time.

A destination may be a target location, or a clustered destination. A target location, or a clustered destination, may comprise a cluster of vehicle positions that is representative of a target location. For example, the vehicle positions may be grouped into clusters with a known clustering method, with each cluster corresponding to a target location of the user. Known clustering methods are DBSCAN or agglomerative clustering. The vehicle may be parked by the user at slightly different vehicle positions that are representative of a target location. If the vehicle position is determined by a global satellite navigation system, inaccuracies can occur in the determination of the vehicle position. The clustering of the vehicle positions makes it possible to avoid inaccuracies in the determination of the vehicle position and/or slightly different vehicle positions when the vehicle is parked by the user, and/or the destination can be predicted more accurately.

The method 100 may receive 104 a first data set of hyperparameters of a machine learning method. The first data set of hyperparameters may comprise one or more configuration parameters of the machine learning method. Preferably, the first set data of hyperparameters comprises initial an configuration, for example an initial standard configuration, of the machine learning method. Alternatively, a statistical method may be used. The further steps of the method 100 may be applied analogously to a statistical method.

A machine learning method may be, for example, logistic regression, support vector machine (SVM), random forest, artificial neural networks, boosting or the K-nearest-neighbor algorithm. Each of these examples of machine learning methods comprises a predefined number of hyperparameters. For random forest, there are the following hyperparameters for training:

number of trees,
Gini or entropy criterion for measuring a quality of splits,
maximum tree depth,
minimum number of examples required to split a node,
minimum number/minimum proportion of examples in the leaves of the trees,
number of features used to create a tree,
maximum number of tree nodes,
minimum decrease in impurity for a split,
impurity threshold that determines when tree growth is stopped, and
use of bootstrapping.

The method 100 may train 106 the machine learning method with the received first data set of hyperparameters using the first quantity of destinations as training data. Alternatively, the training 106 of the machine learning method may be effected using the total quantity of destinations.

The method may receive 108 a second quantity of destinations of the user of the vehicle for a second period of time 108. The second quantity of destinations may comprise historical destinations of the user in the second period of time. The second quantity of destinations may correspond to the first quantity of destinations. Preferably, the second quantity of destinations is different from the first quantity of destinations. The second period of time may be a subdivision of the total period of time, which may be divided into the first period of time and a second period of time. Preferably, the second period of time is less than the first period of time. The first quantity of destinations may be used as training data for training the machine learning method. The second quantity of destinations may be used as validation data for training the machine learning method. In addition to dividing the total quantity of destinations into a first quantity of destinations and a second quantity of destinations, further methods may be used to divide the destinations. For example, the destinations may be divided by means of rolling cross-validation.

The method 100 may predict 110 destinations and probabilities of the destinations from the second quantity of destinations as validation data with the trained machine learning method having the first data set of hyperparameters. Preferably, the destinations are clustered destinations. The trained machine learning method may determine a probability for each destination. The following features may be used for predicting the destinations:

vehicle position at the start of a journey,
vehicle location at the start of a journey,
vehicle position and/or vehicle location of the previous n journeys,
time of day, day of the week,
absolute time, e.g. number of seconds since 1 Jan. 1970 00:00 hrs
seat occupancy, and/or
current vehicle position and/or the last n vehicle positions of a current journey, if a prediction is to be effected during the journey.

Further, the method 100 may evaluate 112 the predicted destinations and the probabilities of the predicted destinations from the second quantity of destinations with a cost function. The cost function may evaluate a display frequency and a precision of the predicted destinations. The precision specifies a prediction accuracy of a displayed predicted destination or of a plurality of displayed predicted destinations. To calculate the cost function, the precision for different probability threshold values and the display frequency for different probability thresholds may first be determined. The probability threshold values may be selected in steps of 0.01 between 0 and 1. For each probability threshold value, one value may be determined for the precision and one for the display frequency.

Figure 2:
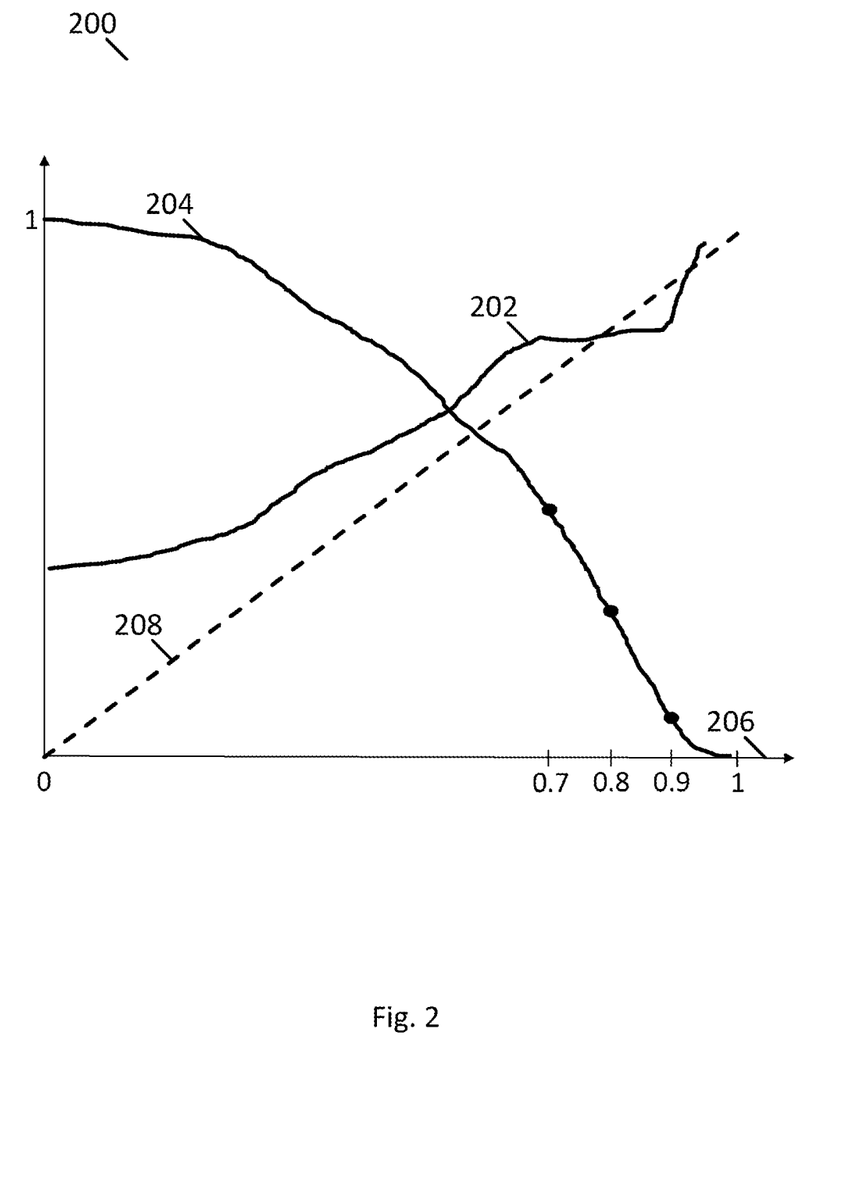
FIG. 2 shows an example of a diagram of a display frequency and a precision for various threshold values.

FIG. 2 shows a diagram 200 for an example of a characteristic of the precision 202 and of the display frequency 204 for various probability threshold values 206. The minimum precision to be expected is shown by 208. The display frequency indicates a proportion of all predicted destinations of which the probability is greater than or equal to the respective probability threshold value. The precision indicates a proportion of all correctly predicted destinations of all displayed, or provided, destinations. In addition, for each predicted destination, it is possible to check whether the predicted destination matches the actual destination. If the predicted destination is a clustered destination, it is possible to determine, for example, a distance between a geoposition of the actual destination and the cluster center of the clustered destination. If the distance is less than a predefined distance threshold, the geoposition of the actual destination matches the predicted destination.

Figure 3:
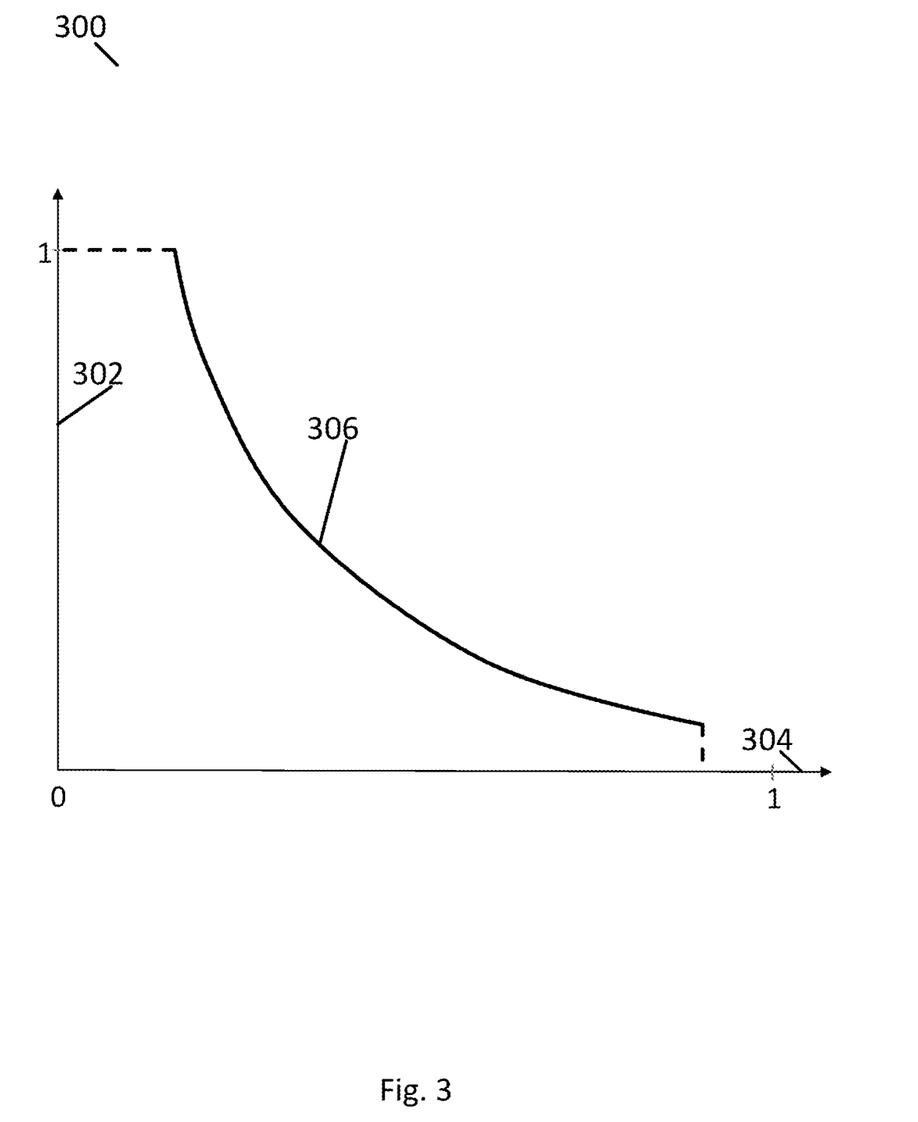
FIG. 3 shows an example of a diagram of a variation of the display frequency with the precision.

FIG. 3 shows, as an example, a diagram 300 of a variation of the display frequency 302 with the precision 304. The diagram 300 shows the display frequency 302 as a function of the precision 304. The curve 306 may be derived, for example, from the value pairs for the display frequency and precision that are shown in the diagram 200. With reference to the diagram 300, various cost functions may be used to evaluate the display frequency and the precision of predicted destinations:

1) display frequency for a fixedly predefined precision value, for example 0.7,
2) area under the display-frequency precision curve from diagram 300 over an entire range of precision values, or
3) area under the display-frequency precision curve from diagram 300 over a predefined range of precision values, for example of between 0.5 and 0.8.

Preferably, variant 1) of the cost function is used for evaluating the predicted destinations. Variants 2) and/or 3) may be used to leave open a specification of a precision during an adaptation of the hyperparameters. For example, the precision may be set dynamically at a later time point by a user of the vehicle and/or based on feedback from the user of the vehicle without the machine learning method and/or the hyperparameters of the machine learning method having to be adapted at a later time point.

The method may determine 114 a second data set of hyperparameters of the machine learning method. The second data set of hyperparameters may be determined by a hyperparameter optimization method. Known hyperparameter optimization methods such as, for example, grid search, random search, and/or Bayesian optimization may be used for this purpose. Further, the determining 114 of the second data set of hyperparameters may be improved by use of a representative sample of, for example, 1000 randomly selected users and their data sets of hyperparameters.

Further, the method 100 may train 116 the machine learning method with the second data set of hyperparameters of the machine learning method using the first quantity of destinations as training data and predict 118 the destinations and the probabilities of the destinations from the second quantity of destinations as validation data with the trained machine learning method having the second data set of hyperparameters as described above. The method 100 may validate 120 the predicted destinations and the probabilities of the predicted destinations from the second quantity of destinations with the cost function described above.

The hyperparameters of the machine learning method may be adapted by the method 100, during a training phase of the machine learning until a method, data set of hyperparameters that maximizes the cost function has been identified. The maximum of the cost function may be a local maximum. Further, parameters for prediction may also be adapted such that the cost function is maximized. In the case of variant 1) of the cost function, the display frequency can be maximized for a predefined precision value. In the case of variants 2) and 3) of the cost function, the area under the curve 306 can be maximized.

If the cost function indicates that the display frequency increases, while maintaining precision, with the machine learning method having the second data set of hyperparameters, the training phase of the machine learning method can be ended. It has been possible to find a local maximum for the cost function. The trained machine learning method having the second data set of hyperparameters may be used to predict a current destination and a probability of the current destination 122. In order to predict a geoposition as the current destination, a cluster center of the current destination may be calculated. For example, the cluster center point may be the arithmetic mean of all geopositions, or vehicle positions, in the cluster.

Finally, the method 100 may provide 124 the predicted current destination to the user if the probability of the predicted current destination exceeds a predefined threshold value. The predefined threshold value may be fixedly predefined or determined dynamically. For example, the threshold value may be specified on a user basis for all users of the vehicle or for an individual user of the vehicle. For example, the threshold value may be specified in dependence on the cost function. If variant 1) of the cost function is used, the predefined threshold value may correspond to the predefined precision of the cost function for which the display frequency of the cost function is maximum. The predefined threshold value may correspond to a minimum threshold value for the provision of current destinations to the user. If variants 2) and 3) of the cost function are used, the predefined threshold value may be specified by a user in the respective precision value ranges. This avoids the need to retrain the machine learning method if the predefined threshold value is changed by the user.

Furthermore, maximization of the cost function may be effected individually for each user. In this case, a specific threshold value for the display or provision of predicted destinations is established for each user.

With each journey that the user makes to a destination, a data set that can be used to train the machine learning method is available for this journey. A machine learning method may be used to retrain or update a prediction model in dependence on a number of new journeys made by the user and/or in dependence on a time interval. The hyperparameters may optionally be adapted when the machine learning method is retrained. If the hyperparameters are adapted, not for example by hyperparameter optimization, when the machine learning method is retrained, the computing power required to retrain the machine learning method can be efficiently reduced. The training and/or re-training of the machine learning method may be executed on a control device of the vehicle and/or a server external to the vehicle.

The user may be provided with one or more destinations. If a plurality destinations are displayed to a user (e.g., via a display screen of the vehicle), each of the displayed destinations should exceed the predefined threshold for providing a destination. If a plurality of destinations are provided to the user, a maximum number may be specified for the providing of the destinations. For example, the maximum number may be 2 or 3 destinations. Providing a plurality of destinations may efficiently increase the probability of providing a correct destination. Alternatively, in the provision of a plurality of destinations, the predefined threshold may be reduced so that a plurality of destinations are actually provided to the user of the vehicle. The display frequency, in the provision of a plurality of destinations, may be defined as the proportion of all journeys for which at least one destination is displayed. The precision, in the provision of a plurality of destinations, may be defined as the proportion of all journeys for which a provided destination corresponded to an actual destination, out of all journeys for which at least one destination was displayed. By adapting the definitions for display frequency and precision of the cost function, the steps of the method 100 described above for adapting the hyperparameters can still be executed.

Advantageously, the method 100 may efficiently provide a predicated current destination to a user of a vehicle at the start of the journey and/or efficiently update it during the journey. This efficiently prevents the user from being distracted by the provision of the destination, as only relevant destinations are provided to the user.

Further, the destination may be entered by the user or automatically transferred to a route guidance of a navigation system of the vehicle.

LIST OF REFERENCE DESIGNATIONS 100 method
102 receiving a first quantity of destinations
104 receiving a first data set of hyperparameters
106 training the machine learning method
108 receiving a second quantity of destinations
110 predicting destinations and probabilities of the destinations from the second quantity of destinations
112 evaluating the predicted destinations and the probabilities of the predicted destinations from the second quantity of destinations with a cost function
114 determining a second data set of hyperparameters
116 training the machine learning method 116
118 predicting the destinations and the probabilities of the destinations from the second quantity of destinations
120 evaluating the predicted destinations and the probabilities of the predicted destinations from the second quantity of destinations with the cost function
122 predicting a current destination and a probability of the current destination with the trained machine learning method having the second data set of hyperparameters
124 providing the predicted current destination to the user
200 diagram
202 precision
204 display frequency
206 probability threshold values
208 expected minimum precision
300 diagram
302 display frequency
304 precision
306 curve of precision over display frequency

What is claimed is:

1. A method for providing a predicted current destination to a user of a vehicle, the method comprising:
receiving a first quantity of destinations of the user of the vehicle based on global satellite navigation data received from the vehicle for a first period of time;
receiving a first data set of hyperparameters of a machine learning method;
training the machine learning method with the received hyperparameters of the machine learning method using the first quantity of destinations as training data;
receiving a second quantity of destinations of the user of the vehicle based on global satellite navigation data received from the vehicle for a second period of time;
predicting destinations and probabilities of the destinations from the second quantity of destinations as validation data with the trained machine learning method having the first data set of hyperparameters;
evaluating the predicted destinations and the probabilities of the predicted destinations from the second quantity of destinations with a cost function, wherein the cost function evaluates a display frequency and a precision of the predicted destinations, wherein the display frequency indicates a proportion of the predicted destinations having a probability that exceeds a probability threshold value;

determining a second data set of hyperparameters of the machine learning method;

training the machine learning method with the second data set of hyperparameters of the machine learning method using the first quantity of destinations as training data;

predicting the destinations and the probabilities of the destinations from the second quantity of destinations as validation data with the trained machine learning method having the second data set of hyperparameters;

evaluating the predicted destinations and the probabilities of the predicted destinations from the second quantity of destinations with the cost function; and when the cost function indicates that the display frequency increases, while maintaining precision, with the machine learning method having the second data set of hyperparameters:

predicting a current destination and a probability of the current destination with the trained machine learning method having the second data set of hyperparameters; and providing the predicted current destination to the user when the probability of the predicted current destination exceeds a predefined threshold value.

2. The method as claimed in claim 1, the method furthermore comprising:

when the cost function indicates that the display frequency falls or remains the same, while maintaining precision, with the machine learning method having the second data set of hyperparameters:

predicting a current destination and a probability of the current destination with the trained machine learning method having the first data set of hyperparameters; and providing the predicted current destination to the user when the probability of the predicted current destination exceeds a predefined threshold value.

3. The method as claimed in claim 1, wherein the predicted current destination is provided to the user of the vehicle at a start of a journey with the vehicle; or wherein the predicted current destination is updated during the journey with the vehicle, and the updated predicted destination is provided to the user of the vehicle.

4. The method as claimed in claim 1, wherein a destination from the first quantity of destinations is a clustered destination; or wherein a destination from the second quantity of destinations is a clustered destination; or a destination from the first quantity of destinations or a destination from the second quantity of destinations is a historical destination of the user of the vehicle.

5. The method as claimed in claim 1, wherein the predefined threshold value is a user-specific threshold value, the method further comprising adjusting the threshold value such that the predicted destination provided to the user is more accurate or less accurate based on the adjustment to the predefined threshold value.

6. The method as claimed in claim 1, wherein the current destination and the probability of the current destination is predicted with the machine learning method in dependence on a vehicle position at a start of a journey or a departure time of the journey.

7. The method as claimed in claim 1 wherein the predicted current destination is provided to the user on a display of the vehicle.

8. A non-transitory computer-readable medium for providing a predicted current destination to a user of a vehicle, wherein the computer-readable medium comprises instructions which, when executed on a processor, cause the processor to:

receive a first quantity of destinations of the user of the vehicle based on global satellite navigation data received from the vehicle for a first period of time;

receive a first data set of hyperparameters of a machine learning method;

train the machine learning method with the received hyperparameters of the machine learning method using the first quantity of destinations as training data;

receive a second quantity of destinations of the user of the vehicle based on global satellite navigation data received from the vehicle for a second period of time;

predict destinations and probabilities of the destinations from the second quantity of destinations as validation data with the trained machine learning method having the first data set of hyperparameters;

evaluate the predicted destinations and the probabilities of the predicted destinations from the second quantity of destinations with a cost function, wherein the cost function evaluates a display frequency and a precision of the predicted destinations, wherein the display frequency indicates a proportion of the predicted destinations having a probability that exceeds a probability threshold value;

determine a second data set of hyperparameters of the machine learning method;

train the machine learning method with the second data set of hyperparameters of the machine learning method using the first quantity of destinations as training data;

predict the destinations and the probabilities of the destinations from the second quantity of destinations as validation data with the trained machine learning method having the second data set of hyperparameters;

evaluate the predicted destinations and the probabilities of the predicted destinations from the second quantity of destinations with the cost function; and when the cost function indicates that the display frequency increases, while maintaining precision, with the machine learning method having the second data set of hyperparameters:

predict a current destination and a probability of the current destination with the trained machine learning method having the second data set of hyperparameters; and provide the predicted current destination to the user when the probability of the predicted current destination exceeds a predefined threshold value.

9. The computer-readable medium of claim 8 wherein the computer-readable medium comprises instructions which, when executed on a processer, further cause the processer to:

when the cost function indicates that the display frequency falls or remains the same, while maintaining precision, with the machine learning method having the second data set of hyperparameters:

predict a current destination and a probability of the current destination with the trained machine learning method having the first data set of hyperparameters; and provide the predicted current destination to the user when the probability of the predicted current destination exceeds a predefined threshold value.

10. The computer-readable medium of claim 8, wherein the predicted current destination is provided to the user of the vehicle at a start of a journey with the vehicle; or wherein the predicted current destination is updated during the journey with the vehicle, and the updated predicted destination is provided to the user of the vehicle.

11. The computer-readable medium of claim 8, wherein a destination from the first quantity of destinations is a clustered destination; or
wherein a destination from the second quantity of destinations is a clustered destination; or
a destination from the first quantity of destinations or a destination from the second quantity of destinations is a historical destination of the user of the vehicle.

12. The computer-readable medium of claim 8, wherein the predefined threshold value is a user-specific threshold value, and wherein the computer-readable medium comprises instructions which, when executed on the processor, cause the processor to allow the user to adjust the predefined threshold value such that the predicted current destination provided to the user is more accurate or less accurate based on the adjustment to the predefined threshold value.

13. The computer-readable medium of claim 8, wherein the current destination and the probability of the current destination is predicted with the machine learning method in dependence on a vehicle position at a start of a journey or a departure time of the journey.

14. The computer-readable medium of claim 8, wherein the predicted current destination is provided to the user on a display of the vehicle.

15. A vehicle comprising:
a vehicle display; and
a controller in communication with the display, the controller configured to:
receive a first quantity of destinations of the user of the vehicle for a first period of time;
receive a first data set of hyperparameters of a machine learning method;
train the machine learning method with the received hyperparameters of the machine learning method using the first quantity of destinations as training data;
receive a second quantity of destinations of the user of the vehicle for a second period of time;
predict destinations and probabilities of the destinations from the second quantity of destinations as validation data with the trained machine learning method having the first data set of hyperparameters;
evaluate the predicted destinations and the probabilities of the predicted destinations from the second quantity of destinations with a cost function, wherein the cost function evaluates a display frequency and a precision of the predicted destinations, wherein the display frequency indicates a proportion of the predicted destinations having a probability that exceeds a probability threshold value;
determine a second data set of hyperparameters of the machine learning method;
train the machine learning method with the second data set of hyperparameters of the machine learning method using the first quantity of destinations as training data;
predict the destinations and the probabilities of the destinations from the second quantity of destinations as validation data with the trained machine learning method having the second data set of hyperparameters;
evaluate the predicted destinations and the probabilities of the predicted destinations from the second quantity of destinations with the cost function; and
when the cost function indicates that the display frequency increases, while maintaining precision, with the machine learning method having the second data set of hyperparameters:
predict a current destination and a probability of the current destination with the trained machine learning method having the second data set of hyperparameters; and
provide the predicted current destination to the user on the vehicle display when the probability of the predicted current destination exceeds a predefined threshold value.

16. The vehicle of claim 15 wherein the controller is further configured to:
when the cost function indicates that the display frequency falls or remains the same, while maintaining precision, with the machine learning method having the second data set of hyperparameters:
predict a current destination and a probability of the current destination with the trained machine learning method having the first data set of hyperparameters; and
provide the predicted current destination to the user when the probability of the predicted current destination exceeds a predefined threshold value.

17. The vehicle of claim 15, wherein the predicted current destination is provided to the user of the vehicle at a start of a journey with the vehicle; or
wherein the predicted current destination is updated during the journey with the vehicle, and the updated predicted destination is provided to the user of the vehicle.

18. The vehicle of claim 15, wherein a destination from the first quantity of destinations is a clustered destination; or
wherein a destination from the second quantity of destinations is a clustered destination; or
a destination from the first quantity of destinations or a destination from the second quantity of destinations is a historical destination of the user of the vehicle.

19. The vehicle of claim 15, wherein the predefined threshold value is a user-specific threshold value, and wherein the controller is further configured to allow the user to adjust the predefined threshold value such that the predicted current destination provided to the user is more accurate or less accurate based on the adjustment to the predefined threshold value.

20. The vehicle of claim 15, wherein the current destination and the probability of the current destination is predicted with the machine learning method in dependence on a vehicle position at a start of a journey or a departure time of the journey.

* * * * *